(12) United States Patent
Walker (10) Patent No.: US 8,461,551 B2
(45) Date of Patent: Jun. 11, 2013

(54) DOCUMENT PRODUCTION AND AUTHENTICATION SYSTEM AND METHOD

(75) Inventor: Steven H Walker, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1699 days.

(21) Appl. No.: 11/174,122

(22) Filed: Jul. 1, 2005

(65) Prior Publication Data

US 2005/0242297 A1 Nov. 3, 2005

Related U.S. Application Data

(62) Division of application No. 10/295,108, filed on Nov. 14, 2002, now Pat. No. 6,979,827.

(51) Int. Cl.
*G01N 21/64* (2006.01)

(52) U.S. Cl.
USPC ..................................................... 250/461.1

(58) Field of Classification Search
USPC ..................................................... 250/461.1
See application file for complete search history.

(56) References Cited

U.S. PATENT DOCUMENTS

| | | |
|---|---|---|
| 4,310,180 A | 1/1982 | Mowry, Jr. et al. |
| 4,756,557 A | 7/1988 | Kaule et al. |
| 5,487,567 A | 1/1996 | Volpe |
| 5,601,683 A | 2/1997 | Martin |
| 5,788,285 A | 8/1998 | Wicker |
| 5,944,927 A | 8/1999 | Seifert |
| 5,961,152 A | 10/1999 | Washburn et al. |
| 5,974,150 A * | 10/1999 | Kaish et al. .................. 713/179 |
| 6,036,298 A | 3/2000 | Walker |
| 6,246,061 B1 | 6/2001 | Ramsey et al. |
| 6,322,192 B1 | 11/2001 | Walker |

OTHER PUBLICATIONS

"Prescription Pads Security from Brant Business Forms", http://cyboard.com/PrescriptionSecurity/main.html, Downloaded from Internet Mar. 2, 2002, 2 pgs.
"Site Employs Biometrics for E-PrescriptionSecurity", http://www.computeruser.com/clickit/printout/news/305035200002109440.html, Apr. 18, 2000, 2 pgs.
"Who Needs Security Paper?" http://www.1st-copyright-security-paper.com, 2002, 4 pgs.
"Fraud Alert-Prescription Pads" http://www.1st-copyright-security-paper.com/security-paper-prescription-pads.html, 2001, 3 pgs.

* cited by examiner

*Primary Examiner* — Walter L Lindsay, Jr.
*Assistant Examiner* — Jessica L Eley (57) ABSTRACT

A method of authenticating a document including data printed on a media includes detecting one of a presence and an absence of authentication fibers in the media, detecting one of a presence and an absence of authentication indicia on the media, and continuing the method if detecting one of the presence and the absence of authentication fibers in the media includes detecting the presence of authentication fibers in the media and if detecting one of the presence and the absence of authentication indicia on the media includes detecting the presence of authentication indicia on the media.

24 Claims, 6 Drawing Sheets

*Fig. 12*

DOCUMENT PRODUCTION AND AUTHENTICATION SYSTEM AND METHOD

CROSS-REFERENCE TO RELATED APPLICATIONS

This application is a Divisional of U.S. patent application Ser. No. 10/295,108, filed on Nov. 14, 2002 now U.S. Pat. No. 6,979,827, which is incorporated herein by reference.

BACKGROUND OF THE INVENTION

Due to the widespread availability of high-quality, low-priced photocopiers and desk-top publishing systems, counterfeiting of documents is becoming, now more than ever, a serious problem. Various attempts have been made to prevent counterfeiting and ensure authentication of documents. For example, documents have been provided with security features for preventing illicit copying and/or forgery. One such security feature includes the inclusion of fibers or threads in the media of a document. However, if the media is illegitimately obtained, a false document may still be produced with the media. Thus, an additional level of security is desirable to ensure authenticity of a document, such as originality and/or a source of the document.

For these and other reasons, there is a need for the present invention.

SUMMARY OF THE INVENTION

One aspect of the present invention provides a method of authenticating a document including data printed on a media. The method includes detecting one of a presence and an absence of authentication fibers in the media, detecting one of a presence and an absence of authentication indicia on the media, and continuing the method if detecting one of the presence and the absence of authentication fibers in the media includes detecting the presence of authentication fibers in the media and if detecting one of the presence and the absence of authentication indicia on the media includes detecting the presence of authentication indicia on the media.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
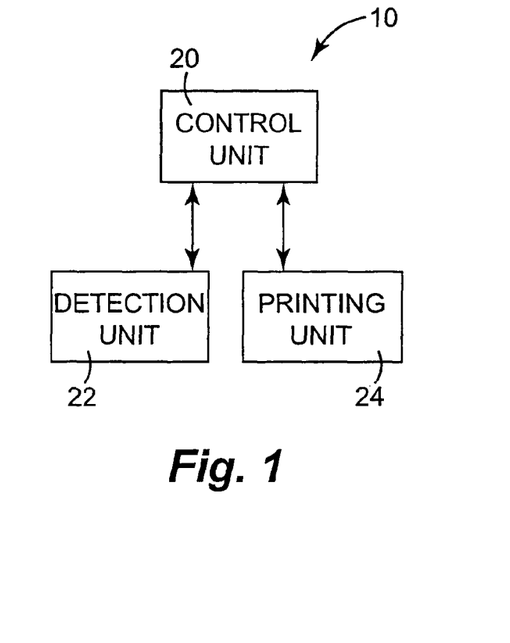
FIG. 1 is a block diagram illustrating one embodiment of a document production system.

FIG. 1 illustrates one embodiment of a document production system 10. Document production system 10 facilitates production of an authenticatable document including authenticatable data printed on a media. The authenticatable data may include any pictorial, graphical, and/or textural characters, symbols, illustrations, and/or other representation of information. In addition, the media may include any type of material upon which any pictorial, graphical, and/or textural image may be produced. In one embodiment, the media includes any type of sheet material such as paper, including photographic paper, card stock, transparencies, Mylar, and the like. Furthermore, the authenticatable document may include one or more pages of the media.

Figure 2:
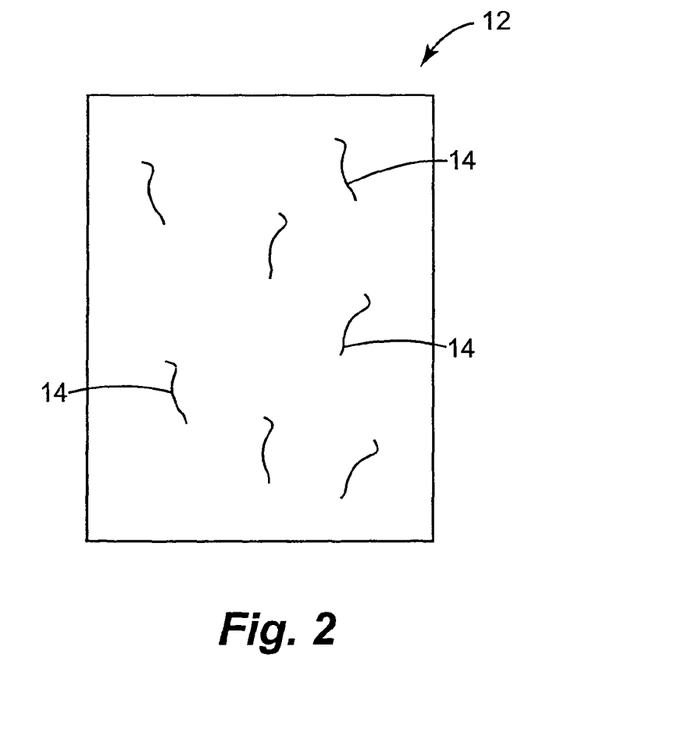
FIG. 2 is a schematic illustration of one embodiment of a media used in the document production system of FIG. 1.

FIG. 2 illustrates one embodiment of a media 12 used by document production system 10. Media 12 is a sheet material and has authentication fibers 14 embedded therein. Authentication fibers 14 include a plurality of fibers, filaments, or threads embedded in the material of media 12. In one embodiment, authentication fibers 14 are randomly positioned in media 12. Authentication fibers 14 contribute to the authentication of a document produced by document production system 10, as described below. For illustrative purposes and clarity of the invention, authentication fibers 14 are illustrated schematically as wavy lines in media 12.

In one embodiment, as illustrated in FIG. 1, document production system 10 includes a control unit 20, a detection unit 22, and a printing unit 24. As described below, detection unit 22 detects an absence or a presence of authentication fibers 14 in media 12 and printing unit 24 prints authentication indicia and/or authenticatable data on media 12. Control unit 20 communicates with detection unit 22 and printing unit 24 to coordinate production of an authenticatable document, as described below. While control unit 20, detection unit 22, and printing unit 24 are illustrated as being separate components, it is within the scope of the present invention for control unit 20, detection unit 22, and/or printing unit 24 to be combined with each other and/or share common components.

Control unit 20 includes hardware, software, firmware, or a combination of these. In one embodiment, control unit 20 is included in a computer, computer server, or other microprocessor-based system capable of performing a sequence of logic operations. Components of control unit 20 can be implemented in hardware via a microprocessor, programmable logic device, or state machine, in firmware, or in software within a given device. Operations of control unit 20 may be implemented, for example, as subroutines of a computer program.

In one embodiment, the process of producing an authenticatable document with document production system 10 can occur in control unit 20 and/or an associated computing system. In addition, the process can be distributed throughout the system with individual portions being implemented in separate system components, such as detection unit 22 and/or printing unit 24. Furthermore, the process can be implemented in hardware, software, firmware, or a combination of these.

Printing unit 24 can be included in a printer or printing system capable of producing printed output, including textural and/or graphical images, on a media, such as paper, in response to electronic signals. The printer or printing system may include, for example, an inkjet printer, a laser jet printer, etc.

Figure 3:
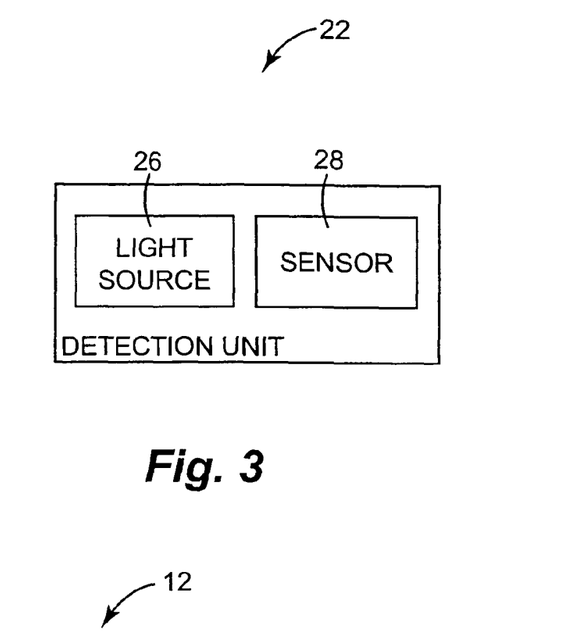
FIG. 3 is a block diagram illustrating one embodiment of a detection unit of the document production system of FIG. 1.

In one embodiment, as illustrated in FIG. 3, detection unit 22 includes a light source 26 and a sensor 28. As such, light source 26 illuminates media 12 including, for example, at least a portion or area of media 12 and sensor 28 optically senses media 12 to detect the presence or the absence of authentication fibers 14 in media 12. More specifically, as light source 26 illuminates a portion or area of media 12, sensor 28 optically senses that portion or area of media 12. Thus, the presence or the absence of authentication fibers 14 in media 12 can be detected. Light source 26 and sensor 28, therefore, visually assess the presence or the absence of authentication fibers 14 in media 12. In one embodiment, detection unit 22 and media 12 are advanced relative to each other to detect the presence or the absence of authentication fibers 14 in media 12.

In one embodiment, authentication fibers 14 are formed of a reflective or luminescent material including, for example, a fluorescent material. Thus, authentication fibers 14 exhibit emissive properties. In another embodiment, authentication fibers 14 are formed of a non-reflective or absorptive material. In addition, in one embodiment, light source 26 includes an ultraviolet light source. As such, reflectance and/or emission of portions or areas of media 12 with authentication fibers 14 embedded therein will vary from other portions or areas of media 12. Thus, compared to other portions or areas of media 12, authentication fibers 14 are readily visible under the ultraviolet light. In one embodiment, with authentication fibers 14 being readily visible under the ultraviolet light, authentication fibers 14 are readily visible, for example, to the naked eye.

Figure 4:
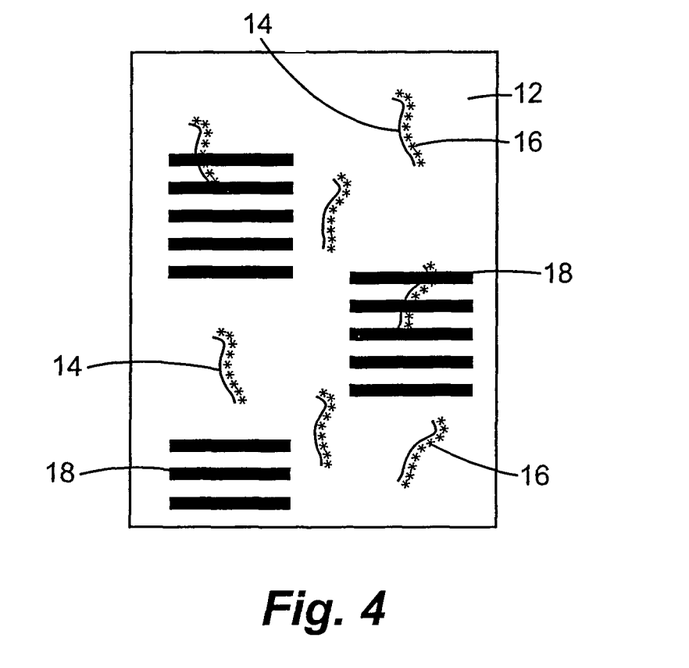
FIG. 4 is a schematic illustration of the media of FIG. 2 including one embodiment of authentication indicia and authenticatable data printed thereon.
Figure 5:
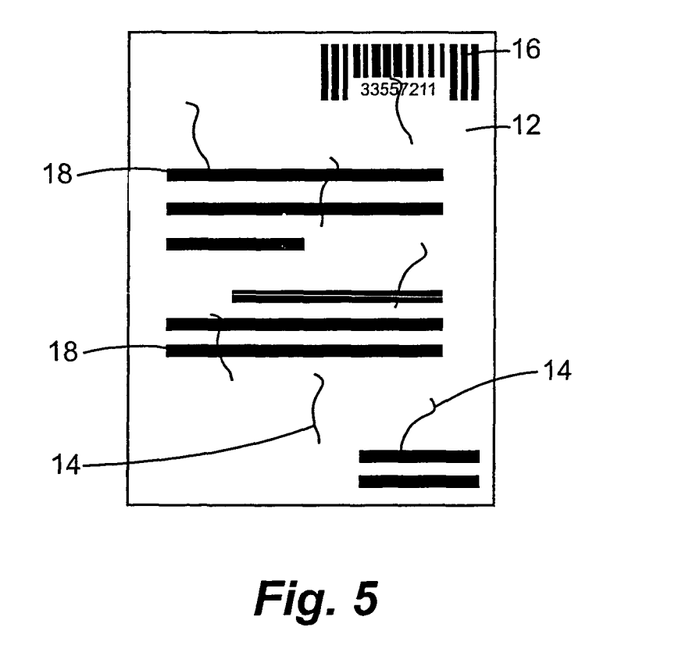
FIG. 5 is a schematic illustration of the media of FIG. 2 including another embodiment of authentication indicia and authenticatable data printed thereon.

FIGS. 4 and 5 illustrate embodiments of authentication indicia 16 printed on media 12. In one embodiment, printing unit 24 prints authentication indicia 16 on media 12 if detection unit 22 detects the presence of authentication fibers 14 in media 12. As such, authentication indicia 16 contributes to the authentication of a document produced by document production system 10, as described below. Authentication indicia 16 may include, for example, any pictorial, graphical, and/or textural characters, symbols, illustrations, and/or other representation of information, including a word, mark, design, seal, or pattern.

In one embodiment, printing unit 24 substantially conceals visibility of authentication indicia 16 on media 12. More specifically, printing unit 24 prints authentication indicia 16 on media 12 such that, under normal viewing conditions, authentication indicia 16 is not readily visible. For example, printing unit 24 prints authentication indicia 16 on media 12 with a low visibility marking material. In one embodiment, the low visibility marking material includes yellow ink or toner. Thus, by substantially concealing visibility of authentication indicia 16, authentication indicia 16 is not readily visible under normal viewing conditions. Under enhanced viewing conditions, however, as described below, authentication indicia 16 is readily visible. In addition, by substantially concealing visibility of authentication indicia 16, authentication indicia 16 is not easily and/or accurately photocopied.

In one embodiment, as illustrated in FIG. 4, printing unit 24 prints authentication indicia 16 on media 12 so as to coincide with authentication fibers 14 embedded in media 12. More specifically, as detection unit 22 detects the presence of authentication fibers 14 in media 12, detection unit 22 identifies a location of authentication fibers 14 in media 12. As such, printing unit 24 prints authentication indicia 16 on media 12 in a location adjacent to the location of authentication fibers 16. Thus, the location of authentication indicia 16 on media 12 substantially corresponds to the location of authentication fibers 14 in media 12. With authentication fibers 14 randomly positioned in media 12, authentication indicia 16 is also randomly positioned on media 12. Accordingly, authentication indicia 16 forms one example of a unique marking provided on media 12.

In another embodiment, as illustrated in FIG. 5, printing unit 24 prints authentication indicia 16 on media 12 such that, under normal viewing conditions, authentication indicia 16 is readily visible. In addition, printing unit 24 prints authentication indicia 16 in one or more areas of media 12. Furthermore, printing unit 24 prints authentication indicia 16 as a unique marking on media 12. For example, authentication indicia 16 may include a unique bar code or a unique arrangement of numbers, characters, and/or symbols printed on media 12. Thus, the unique marking of authentication indicia 16 may constitute a serial number for media 12.

In one embodiment, as illustrated in FIGS. 4 and 5, printing unit 24 also prints data 18 on media 12. Data 18 may include, for example, any pictorial, graphical, and/or textural characters, symbols, illustrations, and/or other representation of information. For illustrative purposes and clarity of the invention, data 18 is illustrated schematically as a plurality of solid lines. With authentication fibers 14 embedded in media 12 and authentication indicia 16 printed on media 12, data 18 constitutes authenticatable data of media 12. More specifically, as described below, data 18 may be authenticated by detecting and analyzing authentication fibers 14 and authentication indicia 16 of media 12.

Figure 6:
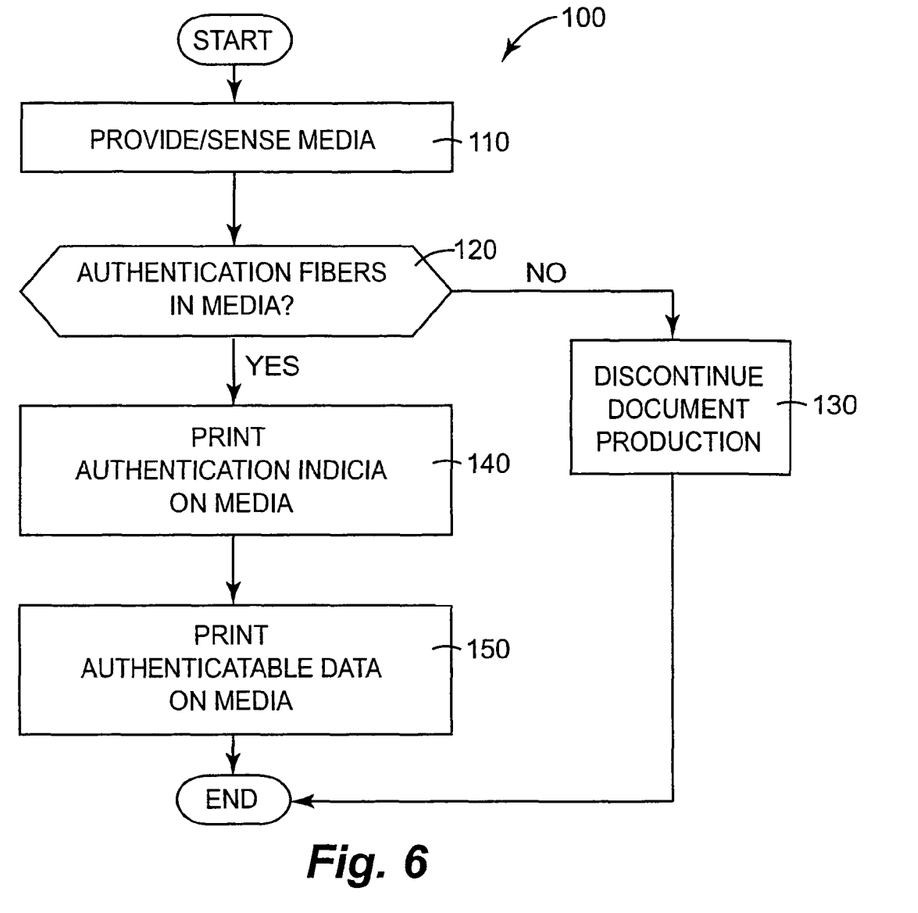
FIG. 6 is a flow diagram illustrating one embodiment of producing an authenticatable document.

FIG. 6 illustrates one embodiment of a method 100 of producing an authenticatable document. Reference is also made to FIGS. 1-5. At step 110, media 12 is provided and/or sensed as being available for document production system 10.

At step 120, whether authentication fibers 14 are present in media 12 is assessed. More specifically, the presence or the absence of authentication fibers 14 in media 12 is assessed. In one embodiment, the presence of authentication fibers 14 in media 12 is detected by detection unit 22, as described above. As such, detection unit 22 detects the presence or the absence of authentication fibers 14 in media 12 by visually assessing media 12.

If, at step 120, authentication fibers 14 are not detected in media 12, method 100 proceeds to step 130. At step 130, production of the authenticatable document is discontinued. More specifically, since media 12 does not have authentication fibers 14 embedded therein, authenticity of media 12 is deficient. Thus, no document is produced.

If, however, authentication fibers 14 are detected in media 12, method 100 proceeds to step 140. As such, production of the authenticatable document continues. At step 140, production of the authenticatable document includes printing of authentication indicia 16 on media 12. In one embodiment, authentication indicia 16 is printed on media 12 by printing unit 24, as described above.

At step 150, production of the authenticatable document continues. At step 150, production of the authenticatable document further includes printing of data 18 on media 12. In one embodiment, data 18 is printed on media 12 by printing unit 24, as described above. As such, an authenticatable document including data 18 printed on media 12 is produced. Thus, data 18 constitutes authenticatable data.

Figure 7:
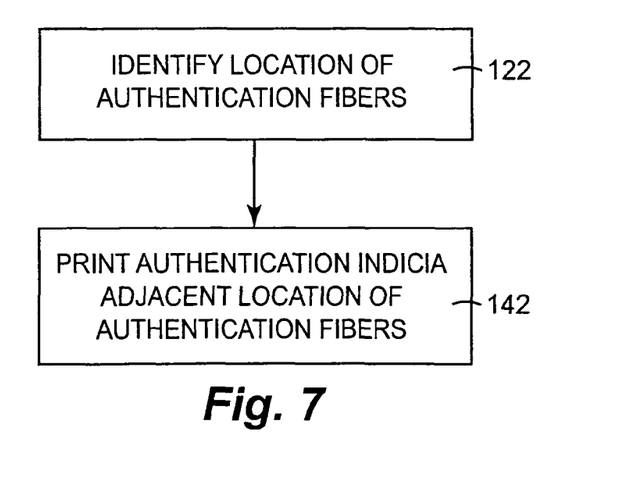
FIG. 7 is a flow diagram illustrating one embodiment of printing authentication indicia in the method of FIG. 6.

In one embodiment, as illustrated in FIG. 7, detecting the presence of authentication fibers 14 in media 12 in step 120 includes identifying a location of authentication fibers 14 in media 12, as indicated in step 122, and printing of authentication indicia 16 on media 12 in step 140 includes printing of authentication indicia 16 adjacent to the location of authentication fibers 14, as indicated in step 142. In one embodiment, the location of authentication fibers 14 in media 12 is identified by detection unit 22, as described above, and authentication indicia 16 is printed adjacent to authentication fibers 14 by printing unit 24, also as described above.

In one embodiment, steps 110-150, including steps 122 and 142, are performed via computer-executable instructions of a computer-readable medium. The computer-readable medium is defined to include any kind of computer memory such as a floppy disk, conventional hard disk, CD-ROM, flash ROM, non-volatile ROM, RAM, etc.

Figure 8:
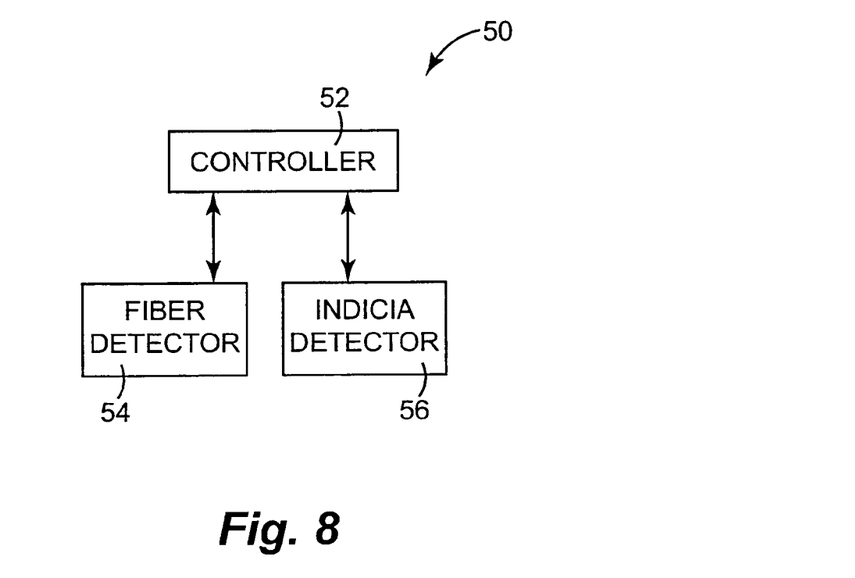
FIG. 8 is a block diagram illustrating one embodiment of a document authentication system.

FIG. 8 illustrates one embodiment of a document authentication system 50. Document authentication system 50 facilitates authentication of a document including data printed on a media. The data may include any pictorial, graphical, and/or textual characters, symbols, illustrations, and/or other representation of information. In addition, the document may include one or more pages of media.

In one embodiment, document authentication system 50 includes a controller 52, a fiber detector 54, and an indicia detector 56. As described below, fiber detector 54 detects an absence or a presence of authentication fibers 14 in the media and indicia detector 56 detects an absence or a presence of authentication indicia 16 on the media. Controller 52 communicates with fiber detector 54 and indicia detector 56 to coordinate authentication of a document, as described below. While fiber detector 54 and indicia detector 56 are illustrated and described as being separate detectors, it is within the scope of the present invention for fiber detector 54 and indicia detector 56 to be the same and/or share components of the same detector.

In one embodiment, controller 52 includes hardware, software, firmware, or a combination of these. In one embodiment, controller 52 is included in a computer, computer server, or other microprocessor-based system capable of performing a sequence of logic operations. Components of controller 52 can be implemented in hardware via a microprocessor, programmable logic device, or state machine, in firmware, or in software within a given device. Operations of controller 52 may be implemented, for example, as subroutines of a computer program.

In one embodiment, the process of authenticating a document with document authentication system 50 can occur in controller 52 and/or an associated computing system. In addition, the process can be distributed throughout the system with individual portions being implemented in separate system components, such as fiber detector 54 and/or indicia detector 56. Furthermore, the process can be implemented in hardware, software, firmware, or a combination of these.

Figure 9:
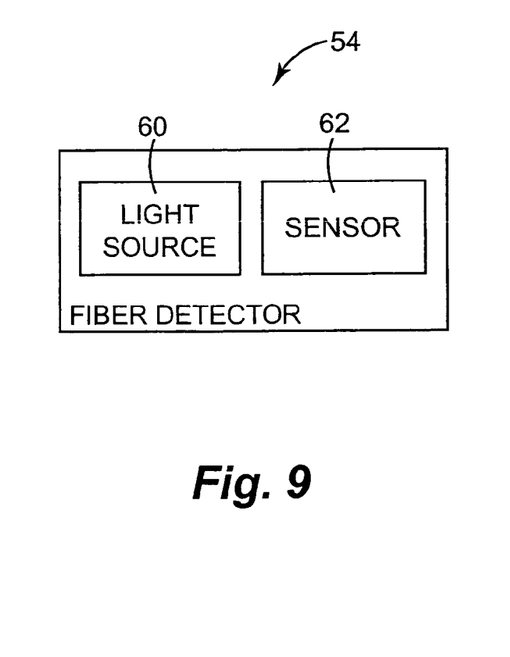
FIG. 9 is a block diagram illustrating one embodiment of a fiber detector of the document authentication system of FIG. 8.

In one embodiment, as illustrated in FIG. 9, fiber detector 54 includes a light source 60 and a sensor 62. As such, light source 60 illuminates the media of the document to be authenticated including, for example, at least a portion or area of the media and sensor 62 optically senses the media to detect the presence or the absence of authentication fibers 14 in the media. More specifically, as light source 60 illuminates a portion or area of the media, sensor 62 optically senses that portion or area of the media. Thus, the presence or the absence of authentication fibers in the media can be detected. Light source 60 and sensor 62, therefore, visually assess the presence or the absence of authentication fibers 14 in the media. In one embodiment, fiber detector 54 and the media are advanced relative to each other to detect the presence or the absence of authentication fibers 14 in the media.

In one embodiment, as described above, authentication fibers 14 are formed of a reflective or luminescent material including, for example, a fluorescent material. In another embodiment, as described above, authentication fibers 14 are formed of a non-reflective or absorptive material. In addition, in one embodiment, light source 60 includes an ultraviolet light source. As such, as described above, reflectance and/or emission of portions or areas of the media with authentication fibers 14 embedded therein will vary from other portions or areas of the media. Thus, compared to other portions or areas of the media, authentication fibers 14 are readily visible under the ultraviolet light.

Figure 10:
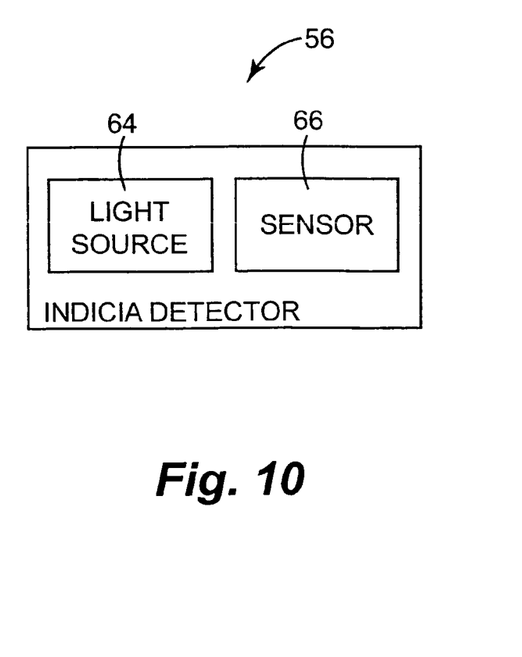
FIG. 10 is a block diagram illustrating one embodiment of an indicia detector of the document authentication system of FIG. 8.

In one embodiment, as illustrated in FIG. 10, indicia detector 56 includes a light source 64 and a sensor 66. As such, light source 64 illuminates the media of the document to be authenticated including, for example, at least a portion or area of the media and sensor 66 optically senses the media to detect the presence or the absence of authentication indicia 16 on the media. More specifically, as light source 64 illuminates a portion or area of the media, sensor 66 optically senses that portion or area of the media. Thus, the presence or the absence of authentication indicia 16 on the media can be detected. Light source 64 and sensor 66, therefore, visually assess the presence or the absence of authentication indicia 16 on the media. In one embodiment, indicia detector 56 and the media are advanced relative to each other to detect the presence or the absence of authentication indicia 16 on the media.

In one embodiment, controller 52 evaluates authenticity of the document if fiber detector 54 detects the presence of authentication fibers 14 in the media and if indicia detector 56 detects the presence of authentication indicia 16 on the media. In one embodiment, controller 52 evaluates authenticity of the document by determining whether authentication indicia 16 is unique. More specifically, controller 52 determines whether authentication indicia 16 is distinct.

In one embodiment, to determine whether authentication indicia 16 is unique, controller 52 compares the location of authentication indicia 16 on the media, as identified by indicia detector 56, and the location of authentication fibers 14 in the media, as identified by fiber detector 52. For example, since the location of authentication fibers 14 in the media is random and, if the location of authentication indicia 16 on the media corresponds to the random locations of authentication fibers 14 in the media, the location of authentication indicia 16 on the media will also be random. Authentication indicia 16, therefore, will be unique. Thus, controller 52 declares the document authentic if the location of authentication indicia 16 on the media substantially corresponds to the location of authentication fibers 14 in the media and declares the document non-authentic if the location of authentication indicia on the media does not substantially correspond to the location of authentication fibers 14 in the media.

In another embodiment, controller 52 compares authentication indicia 16 on the media with other indicia to determine whether authentication indicia 16 is distinct. For example, if authentication indicia 16 includes a bar code or serial number for the document, controller 52 compares the bar code or serial number for the document with other bar codes or serial numbers. As such, controller 52 declares the document authentic if authentication indicia 16 is distinct from other indicia and declares the document non-authentic if authentic indicia 16 is not distinct from other indicia.

Figure 11:
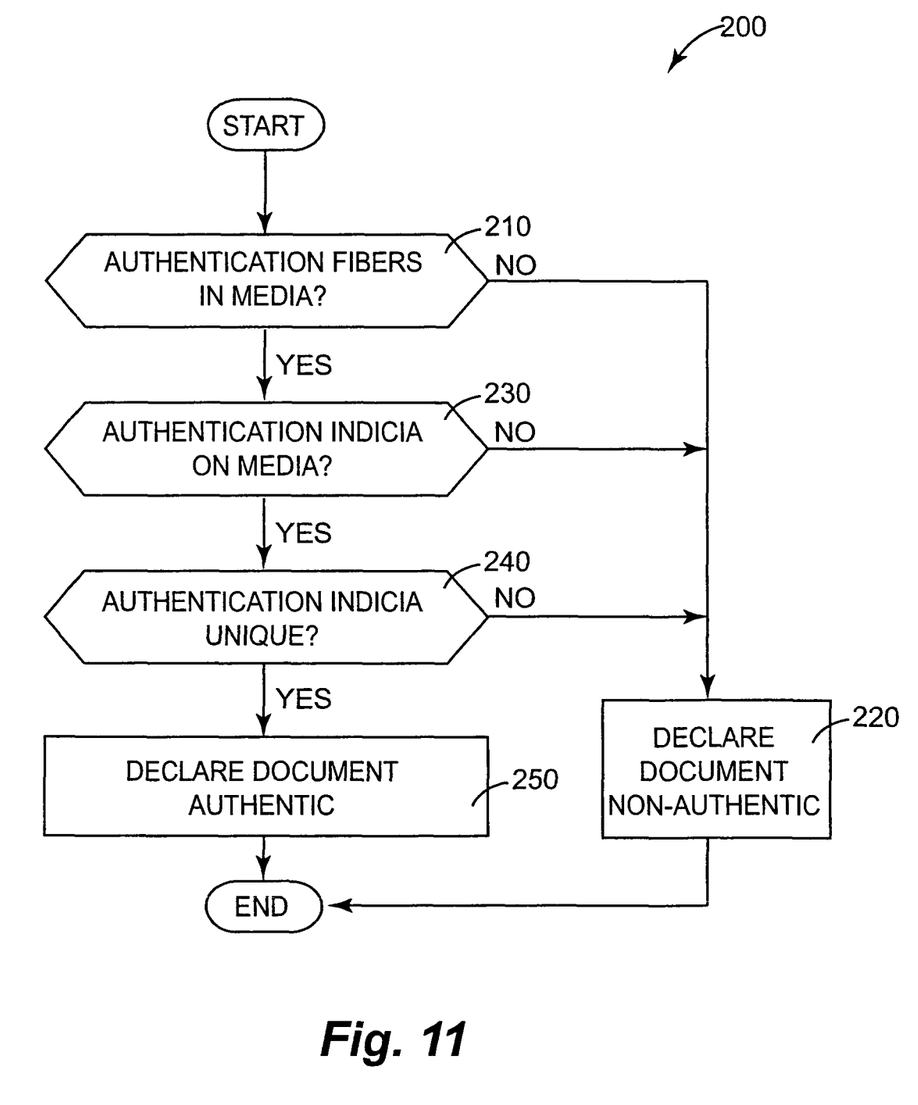
FIG. 11 is a flow diagram illustrating one embodiment of authenticating a document.

FIG. 11 illustrates one embodiment of a method 200 of authenticating a document including data printed on a media. Reference is also made to FIGS. 1-10. At step 210, authentication of the document includes determining whether authentication fibers 14 are present in the media. In one embodiment, the presence of authentication fibers 14 in the media is detected by fiber detector 54, as described above. As such, fiber detector 54 detects a presence or an absence of authentication fibers 14 in the media by visually assessing the media.

If authentication fibers 14 are not detected in the media, method 200 proceeds to step 220. At step 220, the document is declared non-authentic. More specifically, since the media of the document does not have authentication fibers 14 embedded therein, authenticity of the document is deficient. Thus, the document is declared non-authentic.

If, however, authentication fibers 14 are detected in the media, method 200 proceeds to step 230. As such, authentication of the document continues. At step 230, authentication of the document further includes determining whether authentication indicia 16 is provided on the media. In one embodiment, the presence of authentication indicia 16 on the media is detected by indicia detector 56, as described above. As such, indicia detector 56 detects a presence or an absence of authentication indicia 16 on the media by visually assessing the media.

If authentication indicia 16 is not detected on the media, method 200 proceeds to step 220. At step 220, the document is declared non-authentic, as described above. More specifically, since the media of the document does not have authentication indicia 16 printed thereon, authenticity of the document is deficient. Thus, the document is declared non-authentic.

If, however, authentication indicia 16 is detected on the media, method 200 proceeds to step 240. As such, authentication of the document continues. At step 240, authentication of the document further includes determining whether authentication indicia 16 is unique. In one embodiment, whether authentication indicia 16 is unique is determined by controller 52, as described above.

If authentication indicia 16 is not unique, method 200 proceeds to step 220. At step 220, the document is declared non-authentic, as described above. More specifically, since authentication indicia 16 is not unique, authenticity of the document is deficient. Thus, the document is declared non-authentic.

If, however, authentication indicia 16 is unique, method 200 proceeds to step 250. At step 250, the document is declared authentic. More specifically, since the media of the document has authentication fibers 14 embedded therein and authentication indicia 16 printed thereon, and authentication indicia 16 is unique, authenticity of the document is sufficient. Thus, the document is declared authentic.

Figure 12:
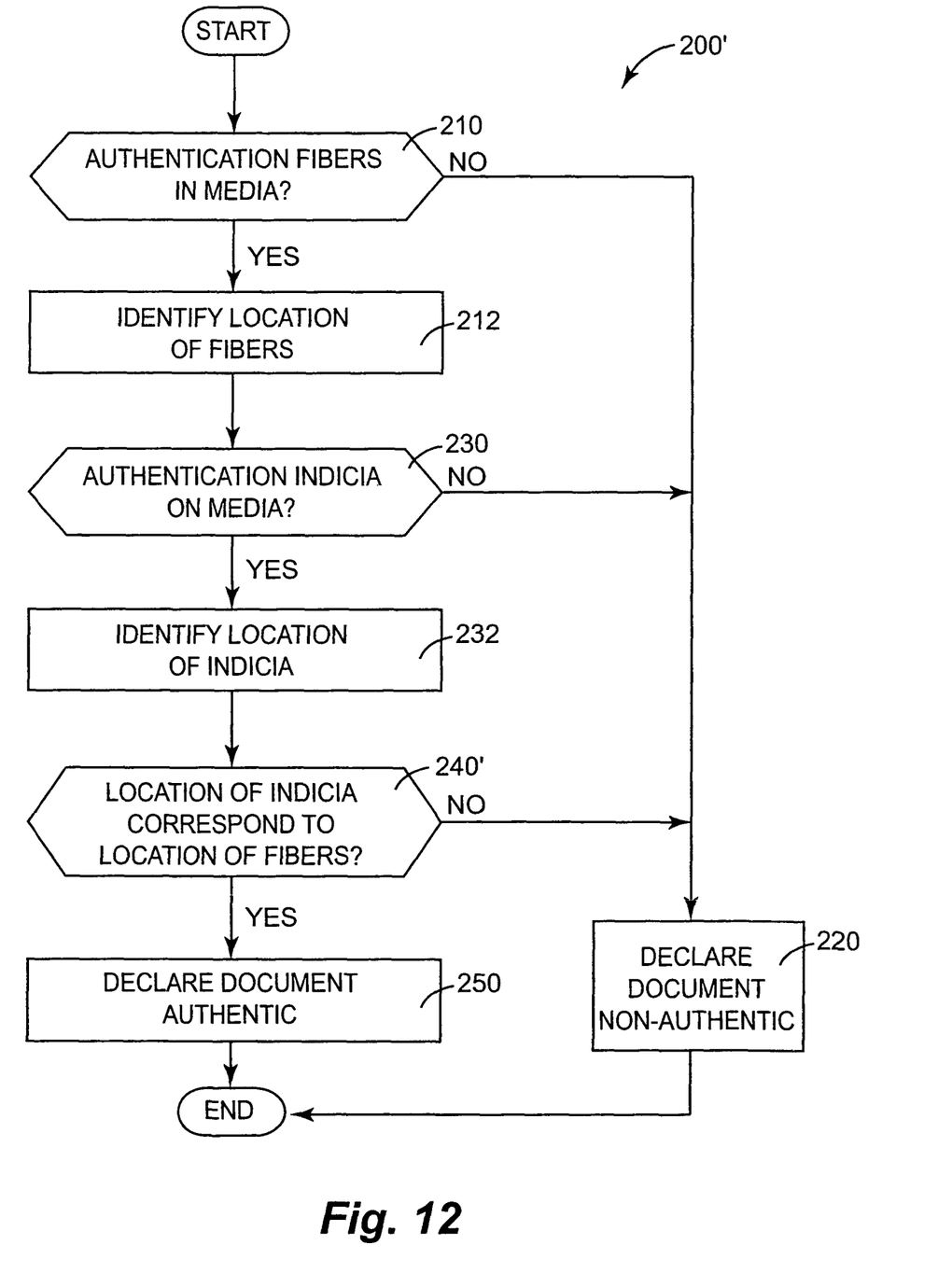
FIG. 12 is a flow diagram illustrating another embodiment of authenticating a document.

FIG. 12 illustrates another embodiment of a method of authenticating a document including data printed on a media. Method 200' is similar to method 200 and includes steps 210, 220, 230, and 250, as illustrated in FIG. 11 and described above. As such, at step 210, authentication of the document includes determining whether authentication fibers 14 are present in the media. In addition, at step 230, authentication of the document further includes determining whether authentication indicia 16 is provided on the media. Furthermore, if authentication fibers 14 are not detected in the media or authentication indicia 16 is not detected on the media, the document is declared non-authentic, as indicated in step 220.

Method 200', however, includes identifying a location of authentication fibers 14 in the media, as indicated in step 212, if authentication fibers 14 are detected in the media, as assessed in step 210, and includes identifying a location of authentication indicia 16 on the media, as indicated in step 232, if authentication indicia 16 is detected on the media, as assessed in step 230.

As such, at step 240', determining whether authentication indicia 16 is unique includes comparing the location of authentication indicia 16 on the media and the location of authentication fibers 14 in the media. More specifically, whether the location of authentication indicia 16 on the media substantially corresponds to the location of authentication fibers 14 in the media is assessed. Thus, if the location of authentication indicia 16 on the media does not substantially correspond to the location of authentication fibers 14 in the media, method 200' proceeds to step 220. At step 220, the document is declared non-authentic, as described above.

If, however, the location of authentication indicia 16 on the media does substantially correspond to the location of authentication fibers 14 in the media, method 200' proceeds to step 250. At step 250, the document is declared authentic, as described above.

In one embodiment, steps 210-250, including steps 212 and 232, are performed via computer-executable instructions of a computer-readable medium. The computer-readable medium is defined to include any kind of computer memory such as a floppy disk, conventional hard disk, CD-ROM, flash ROM, non-volatile ROM, RAM, etc.

While steps of method 200 (including method 200') are described as being performed by controller 52, fiber detector 54, and/or indicia detector 56, it is within the scope of the present invention for one or more steps or portions of steps of method 200 (including method 200') to be performed by a person seeking to authenticate a document. For example, the person seeking to authenticate the document may visually assess the media to determine whether authentication fibers 14 are embedded in the media and/or authentication indicia 16 is printed on the media. The person seeking to authenticate the document may visually assess the media under, for example, ambient light or light from light source 60 and/or 64. In addition, whether authentication indicia 16 is unique may be determined by the person seeking to authenticate the document, with or without the assistance of controller 52, fiber detector 54, and/or indicia detector 56. The person seeking to authenticate the document may determine the uniqueness of authentication indicia 16 by, for example, manually comparing authentication indicia 16 with other indicia and/or comparing a location of authentication indicia 16 on the media with a location of authentication fibers 14 in the media.

By including authentication fibers 14 in media 12 and printing authentication indicia 16 on media 12, authenticity of a document produced by document production system 10 and/or method 100 can be assured. More specifically, originality and/or a source of data printed on Media 12 can be assured. In addition, by assessing the presence of authentication fibers 14 in a media, the presence of authentication indicia 16 on the media, and the uniqueness of the authentication indicia 16, authenticity of a document can be assessed by document authentication system 50 and/or method 200 (including method 200'). Thus, originality and/or a source of a document, including data printed on the media, can be assured.

Example applications for document production system 10 and/or method 100 and document authentication system 50 and/or method 200 (including method 200') include production and/or authentication of medical prescription forms, academic transcripts, confidential documents, legal documents, and/or any other document where authenticity of the document, including originality and/or a source of the document, is desired.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of authenticating a document including data printed on a media, the method comprising:
    detecting one of a presence and an absence of authentication fibers embedded in the media;
    detecting one of a presence and an absence of authentication indicia printed on the media; and
    continuing the method if detecting one of the presence and the absence of authentication fibers embedded in the media includes detecting the presence of authentication fibers embedded in the media and if detecting one of the presence and the absence of authentication indicia printed on the media includes detecting the presence of authentication indicia printed on the media,
    wherein continuing the method includes:
        identifying an embedded location of the authentication fibers embedded in the media;
        identifying a printed location of the authentication indicia printed on the media; and
        declaring the document authentic if the printed location of the authentication indicia printed on the media is adjacent to and substantially corresponds to the embedded location of the authentication fibers embedded in the media.

2. The method of claim 1, wherein continuing the method further includes:
    assessing a uniqueness of the authentication indicia; and
    declaring the document authentic if the authentication indicia is unique.

3. The method of claim 2, wherein assessing the uniqueness of the authentication indicia includes comparing the authentication indicia with other indicia, and wherein declaring the document authentic includes declaring the document authentic if the authentication indicia is distinct from the other indicia.

4. The method of claim 2, further comprising:
    declaring the document non-authentic if the authentication indicia is not unique.

5. The method of claim 1, further comprising:
    declaring the document non-authentic if the printed location of the authentication indicia printed on the media does not substantially correspond to the embedded location of the authentication fibers embedded in the media.

6. The method of claim 1, further comprising:
    discontinuing the method if detecting one of the presence and the absence of authentication fibers embedded in the media includes detecting the absence of authentication fibers embedded in the media; and
    declaring the document non-authentic.

7. The method of claim 1, further comprising:
    discontinuing the method if detecting one of the presence and the absence of authentication indicia printed on the media includes detecting the absence of authentication indicia printed on the media; and
    declaring the document non-authentic.

8. The method of claim 1, wherein detecting one of the presence and the absence of authentication fibers embedded in the media includes visually assessing the media.

9. The method of claim 8, wherein the authentication fibers include a luminescent material, and wherein visually assessing the media includes illuminating the media with ultraviolet light.

10. The method of claim 1, wherein detecting one of the presence and the absence of authentication indicia printed on the media includes visually assessing the media.

11. The method of claim 1, wherein the authentication fibers are embedded in the media in a random pattern and the authentication indicia is printed on the media in a pattern, and wherein declaring the document authentic further includes declaring the document authentic if the pattern of the authentication indicia printed on the media substantially corresponds to the random pattern of the authentication fibers embedded in the media.

12. The method of claim 1, wherein the authentication fibers embedded in the media have a length and the authentication indicia printed on the media includes markings printed on the media, and wherein declaring the document authentic further includes declaring the document authentic if the markings printed on the media follow the length of the authentication fibers embedded in the media.

13. A computer-readable medium having computer-executable instructions for performing a method of authenticating a document including data printed on a media, the method comprising:
    detecting one of a presence and an absence of authentication fibers embedded in the media;
    detecting one of a presence and an absence of authentication indicia printed on the media; and
    continuing the method if detecting one of the presence and the absence of authentication fibers embedded in the media includes detecting the presence of authentication fibers embedded in the media and if detecting one of the presence and the absence of authentication indicia printed on the media includes detecting the presence of authentication indicia printed on the media,
    wherein continuing the method includes:
        identifying an embedded location of the authentication fibers embedded in the media;
        identifying a printed location of the authentication indicia printed on the media; and
        declaring the document authentic if the printed location of the authentication indicia printed on the media is adjacent to and substantially corresponds to the embedded location of the authentication fibers embedded in the media.

14. The computer-readable medium of claim 13, wherein continuing the method further includes:
    assessing a uniqueness of the authentication indicia; and declaring the document authentic if the authentication indicia is unique.

15. A system for authenticating a document including data printed on a media, the system comprising:
- a first detector adapted to detect one of an absence and a presence of authentication fibers embedded in the media;
- a second detector adapted to detect one of an absence and a presence of authentication indicia printed on the media; and
- a controller communicating with the first detector and the second detector, wherein the controller is adapted to detect an embedded location of the authentication fibers embedded in the media, detect a printed location of the authentication indicia printed on the media, and evaluate authenticity of the document if the first detector detects the presence of authentication fibers embedded in the media and the second detector detects the presence of authentication indicia printed on the media,
- wherein the controller is further adapted to declare the document authentic if the printed location of the authentication indicia printed on the media is adjacent to and substantially corresponds to the embedded location of the authentication fibers embedded in the media.

16. The system of claim 15, wherein the controller is further adapted to declare the document authentic if the authentication indicia is unique and declare the document non-authentic if the authentication indicia is not unique.

17. The system of claim 15, wherein the controller is adapted to declare the document non-authentic if the printed location of the authentication indicia printed on the media does not substantially correspond to the embedded location of the authentication fibers embedded in the media.

18. The system of claim 15, wherein the controller is adapted to compare the authentication indicia with other indicia, and wherein the controller is adapted to declare the document authentic if the authentication indicia is distinct from the other indicia and declare the document non-authentic if the authentication indicia is not distinct from the other indicia.

19. The system of claim 15, wherein the controller is adapted to declare the document non-authentic if at least one of the first detector detects the absence of authentication fibers embedded in the media and the second detector detects the absence of authentication indicia printed on the media.

20. The system of claim 15, wherein the first detector includes a light source adapted to illuminate the media and a sensor adapted to optically sense the media.

21. The system of claim 20, wherein the authentication fibers include a luminescent material, and wherein the light source of the first detector includes an ultraviolet light source.

22. The system of claim 15, wherein the second detector includes a light source adapted to illuminate the media and a sensor adapted to optically sense the media.

23. The system of claim 15, wherein the authentication fibers are embedded in the media in a random pattern and the authentication indicia is printed on the media in a pattern, and wherein the controller is further adapted to declare the document authentic if the pattern of the authentication indicia printed on the media substantially corresponds to the random pattern of the authentication fibers embedded in the media.

24. The system of claim 15, wherein the authentication fibers embedded in the media have a length and the authentication indicia printed on the media includes markings printed on the media, and wherein the controller is further adapted to declare the document authentic if the markings printed on the media follow the length of the authentication fibers embedded in the media.

* * * * *